US009505934B2

United States Patent
Ko et al.

(10) Patent No.: US 9,505,934 B2
(45) Date of Patent: Nov. 29, 2016

(54) SUPER-HYDROREPELLENT COATING COMPOSITION, SUPER-HYDROREPELLENT COATING LAYER INCLUDING CURED PRODUCT OF THE SUPER-HYDROREPELLENT COATING COMPOSITION, AND HEAT EXCHANGER INCLUDING THE SUPER-HYDROREPELLENT COATING LAYER

(75) Inventors: Young-Chul Ko, Suwon-si (KR); Woo-Taek Hwang, Seoul (KR); Ha-Jin Kim, Hwaseong-si (KR); Sang Eui Lee, Hwaseong-si (KR); Nak-Hyun Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 563 days.

(21) Appl. No.: 13/643,013

(22) PCT Filed: Apr. 22, 2011

(86) PCT No.: PCT/KR2011/002969
§ 371 (c)(1),
(2), (4) Date: Jan. 3, 2013

(87) PCT Pub. No.: WO2011/133000
PCT Pub. Date: Oct. 27, 2011

(65) Prior Publication Data
US 2013/0112379 A1    May 9, 2013

(30) Foreign Application Priority Data
Apr. 23, 2010 (KR) .................. 10-2010-0038102

(51) Int. Cl.
| C09D 183/04 | (2006.01) |
| C09D 5/00 | (2006.01) |
| C09D 7/12 | (2006.01) |
| B05D 5/00 | (2006.01) |
| F28F 19/02 | (2006.01) |
| C08G 77/12 | (2006.01) |
| C08K 7/04 | (2006.01) |
| C08K 5/5419 | (2006.01) |

(52) U.S. Cl.
CPC .    *C09D 5/00* (2013.01); *B05D 5/00* (2013.01); *C09D 7/1216* (2013.01); *C09D 7/1266* (2013.01); *C09D 7/1275* (2013.01); *C09D 7/1291* (2013.01); *C09D 183/04* (2013.01); *F28F 19/02* (2013.01); *C08G 77/12* (2013.01); *C08K 5/5419* (2013.01); *C08K 7/04* (2013.01); *Y10T 428/24355* (2015.01)

(58) Field of Classification Search
CPC .... C09D 5/00; C09D 7/1216; C09D 7/1266; C09D 7/1275; C09D 7/1291; C09D 183/04; B05D 5/00; C08K 5/5419; C08K 7/02; C08K 7/06; C08K 7/24; C08G 77/12; F28F 19/02
USPC ............................................................. 106/2
See application file for complete search history.

(56) References Cited

U.S. PATENT DOCUMENTS

| 5,360,851 A * | 11/1994 | Feder et al. .................. 524/157 |
| 7,625,976 B2 | 12/2009 | Landon et al. |
| 2007/0173596 A1* | 7/2007 | Landon et al. ............... 524/588 |
| 2009/0124727 A1 | 5/2009 | Nennemann et al. |
| 2009/0163636 A1 | 6/2009 | Muenzmay et al. |
| 2009/0169865 A1 | 7/2009 | Risse et al. |
| 2010/0240829 A1* | 9/2010 | Mapkar .................. B82Y 10/00 524/588 |
| 2011/0143148 A1* | 6/2011 | Butts et al. .................... 428/447 |

FOREIGN PATENT DOCUMENTS

| EP | 1 736 516 A1 | 4/2005 |
| EP | 1 914 277 A1 | 4/2007 |
| KR | 1994-0023587 | 11/1994 |
| KR | 10-2002-0055512 | 7/2002 |
| KR | 10-2008-0084227 | 9/2008 |
| KR | 10-2008-0089385 | 10/2008 |
| WO | WO 2008/103221 A1 * | 8/2008 |
| WO | WO2008/134241 A1 * | 11/2008 ............ C08G 77/58 |
| WO | WO 2010/106425 | 9/2010 |

OTHER PUBLICATIONS

Derwent-ACC-No. 2009-E25078, abstract of Chinese Patent Specification No. CN 101338159 A (Jan. 2009).*
Derwent-ACC-No. 2009-R44790, abstract of Chinese Patent Specification No. CN 101575450 A (Nov. 2009).*
Derwent-ACC-No. 2010-H76129, abstract of Chinese Patent Specification No. CN 101735727 A (Jun. 2010).*
Extended European Search Report issued Aug. 19, 2013 in corresponding European Application No. 11 77 2288.
International Search Report of Corresponding PCT Application PCT/KR2011/002969 mailed Jan. 17, 2012.
Korean Office Action dated Sep. 26, 2016 in corresponding Korean Patent Application No. 10-2010-0038102.

* cited by examiner

Primary Examiner — Anthony J Green
(74) Attorney, Agent, or Firm — Staas & Halsey LLP

(57) ABSTRACT

A super-hydrorepellent coating composition including a nano structure, polyorganosiloxane, a cross-linker, and a catalyst; a super-hydrorepellent coating layer including a cured product of the super-hydrorepellent coating composition; and a heat exchanger including the super-hydrorepellent coating layer.

15 Claims, 16 Drawing Sheets

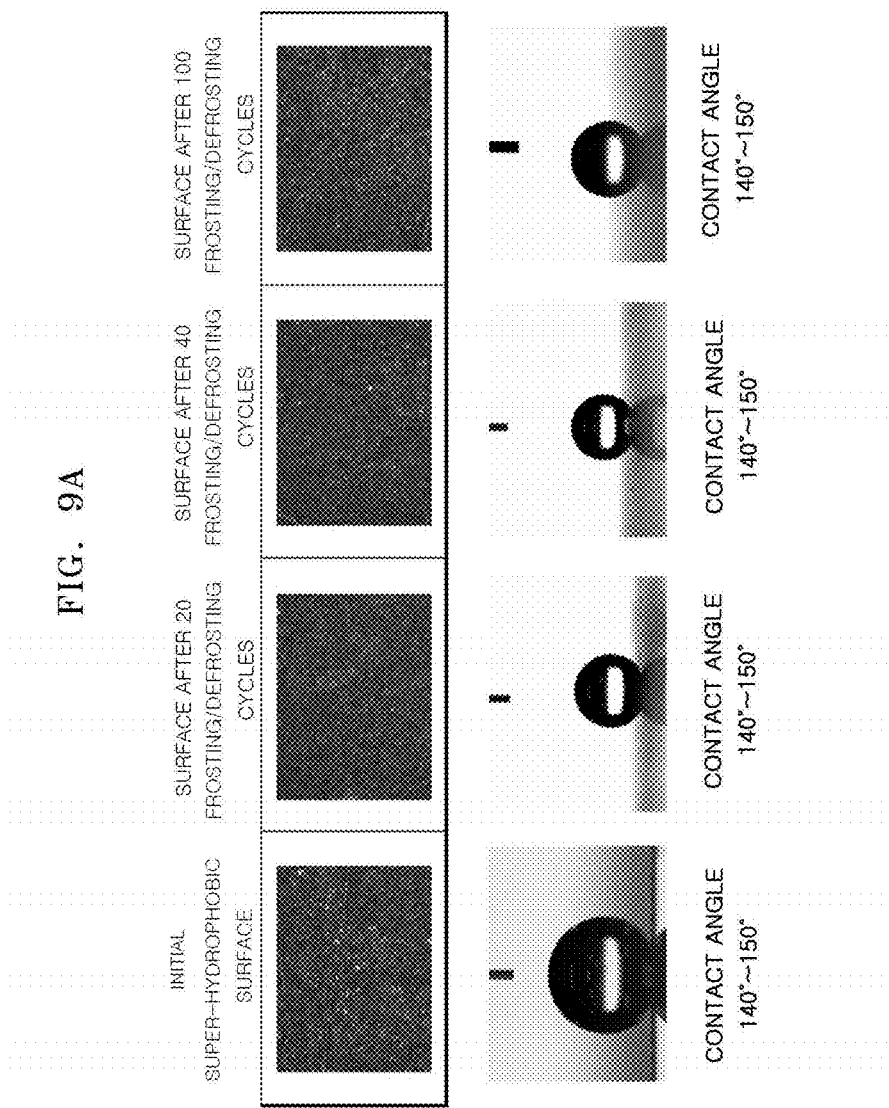

SUPER-HYDROREPELLENT COATING COMPOSITION, SUPER-HYDROREPELLENT COATING LAYER INCLUDING CURED PRODUCT OF THE SUPER-HYDROREPELLENT COATING COMPOSITION, AND HEAT EXCHANGER INCLUDING THE SUPER-HYDROREPELLENT COATING LAYER

CROSS-REFERENCE TO RELATED APPLICATIONS

This application is the national stage application of PCT application PCT/KR2011/002969 filed on Apr. 22, 2011 that claims the benefit of Korean Patent Application No. 10-2010-0038102, filed on Apr. 23, 2010, in the Korean Intellectual Property Office, the disclosure of which is incorporated herein in its entirety by reference.

BACKGROUND

1. Field

The present invention relates to a hydrorepellent composition, for example a super-hydrorepellent coating composition, a super-hydrorepellent coating layer including a cured product of the super-hydrorepellent coating composition, and a heat exchanger including the super-hydrorepellent coating layer.

2. Description of the Related Art

FIG. 1 is a schematic view of a heat exchanger conventionally used in a refrigerator. When high-temperature/wet air flows between a refrigerant pipe and a cooling fin which are maintained at a temperature below a freezing point and heat exchange occurs, frost is formed on the surface of the refrigerant pipe and the cooling fin. Frost continues to grow until the refrigerant pipe and the cooling fin are completely covered by frost or the air flow stops. Once the frost is formed, it intercept the air flow and prevent air cycling. In addition, the formed frost act as a heat resistor and hinder the heat exchange, thereby decreasing a cooling efficiency. Accordingly, a method of defrosting the refrigerant pipe and the cooling fin is required.

According to currently available defrosting methods, frost is removed by heat generated by a heater. Examples of defrosting methods using a heater include a method of defrosting by circulation of air that has been heated by a heater located at a lower portion of a heat exchanger, and a method of defrosting by thermal conduction caused by a heater in a heat exchanger. When these methods are used, however, electric power consumption for defrosting occurs.

Accordingly, studies for reducing electric power consumption required for defrosting by performing a hydrophilic or hydrorepellent treatment on the surface of the heat exchanger to obtain uniform frost formation and a short defrosting time are being performed. The following techniques provide hydro-repellent properties to the heat exchanger.

First, as illustrated in FIG. 2A, a hydrorepellent fluorine-substituted polymer layer may be used. For example, a polymer layer formed by polymerizing a material containing a fluorocarbon group and a chlorosilane group, or a polymer layer formed by polymerizing a material containing a fluorocarbon group and an alkoxysilane group are formed on the surface of a heat exchanger.

Second, as illustrated in FIG. 2B, the surface of the heat exchanger may be reformed to have a hydro-repellent property by allowing the surface of the heat exchanger to have a micro-scale uneven structure.

Third, as illustrated in FIG. 2C, a micronano pattern is formed by performing lithography on the surface of the heat exchanger and then dry-etching the heat exchanger to form a nano structure.

Fourth, as illustrated in FIG. 2D, a nanostructure such as a carbon nanotube (CNT), ZnO, or Si may be vertically grown on a substrate.

However, when a polymer layer with a hydro-repellent property such as a fluorine-substituted polymer is formed as described above, surface characteristics of the polymer layer may be quickly degraded by the repeated cycle of frosting and defrosting. In addition, when a micro nano structure is used, plasma etching or photolithography are required to form the micro nano structure. Thus, the method using the micro nano structure is not suitable for commercial use.

SUMMARY

According to an aspect, there is provided a super-hydrorepellent coating composition including a nano structure, polyorganosiloxane, a cross-linker, and a catalyst.

The super-hydrorepellent coating composition may include about 0.1 to about 500 parts by weight of the nano structure, about 1 to about 200 parts by weight of the cross-linker, and about 0.001 to about 10 parts by weight of the catalyst, based on 100 parts by weight of polyorganosiloxane.

The nano structure may include at least one kind of substance selected from the group consisting of a carbon nanotube, carbon nanofiber, a Si nanowire, a ZnO nanowire, a Cu nanowire, and a GaN nanowire.

The nano structure may have a diameter of about 1 to about 1,000 nm and a length of about 0.01 to about 1,000 µm.

The polyorganosiloxane may contain a siloxane repeating unit represented by Formula 1, and a weight average molecular weight of about 200 to about 300,000:

   <Formula 1> wherein $R^1$ and $R^2$ are, each independently, a substituted or unsubstituted C1 to C10 alkyl group, a substituted or unsubstituted C1 to C10 alkoxy group, a substituted or unsubstituted C2 to C10 alkenyl group, or a substituted or unsubstituted C6 to C20 aryl group.

The polyorganosiloxane may include at least one kind of material selected from the group consisting of polydimethylsiloxane, polymethylphenylsiloxane, polydiphenylsiloxane, polyfluorinesiloxane, and polyvinylsiloxane, and a copolymer or combination thereof.

The cross-linker may include at least one kind of material selected from the group consisting of a silane-based compound and an organohydrogensiloxane-based compound having a Si—H bond.

The catalyst may include a tin compound, a titanium compound, a zirconium compound, a lead compound, an iron compound, a cobalt compound, an antimony compound, a manganese compound, a bismuth compound, a zinc compound, a platinum compound, a palladium compound, or a rhodium compound.

The super-hydrorepellent coating composition may further include a filler.

The filler may include one or more kind of filler selected from a filler having a micro diameter and a filler having a nano diameter.

The filler may include silica, quartz, titanium dioxide, magnesium oxide, zinc oxide, iron oxide, zirconium oxide, aluminum oxide, magnesium carbonate, calcium carbonate, zinc carbonate, layered mica, carbon black, and diatomaceous earth.

The amount of the filler is in the range of about 1 to about 100 parts by weight based on 100 parts by weight of polyorganosiloxane.

According to an aspect, there is provided a method of forming a super-hydrorepellent coating layer, including coating the nano structure-containing super-hydrorepellent coating composition according to any of the above compositions on a mother substance and curing the formed coating layer.

The coating may be selected from the group consisting of spin-coating, spray-coating, laminating, and a dip-coating.

The method may further include, following the curing, surface-treating the coating layer so as to allow an end of the nano structure to protrude to the outside of the coating layer.

The surface-treating is a method selected from the group consisting of a plasma etching and a wet etching.

According to an aspect, there is provided a super-hydrorepellent coating layer including a cured product of a super-hydrorepellent coating composition including a nano structure, polyorganosiloxane, a cross-linker, and a catalyst, wherein an end of the nano structure protrudes to the outside of the cured product.

The cured product may further include a filler, wherein the filler is located inside the cured product or protrudes to the outside of the cured product.

According to an aspect, there is provided a heat exchanger comprising the super-hydrorepellent coating layer described above at its surface

BRIEF DESCRIPTION OF THE DRAWINGS

The above and other features and advantages of the present disclosure will become more apparent by describing in detail exemplary embodiments thereof with reference to the attached drawings in which:

FIG. 9A shows pictures showing a contact state of a waterdrop and a surface of a coating layer formed according to Example 2-4, when a frosting/defrosting cycle is repeated 100 times with respect to a heat exchanger including the coating layer;

DETAILED DESCRIPTION

Figure 1:
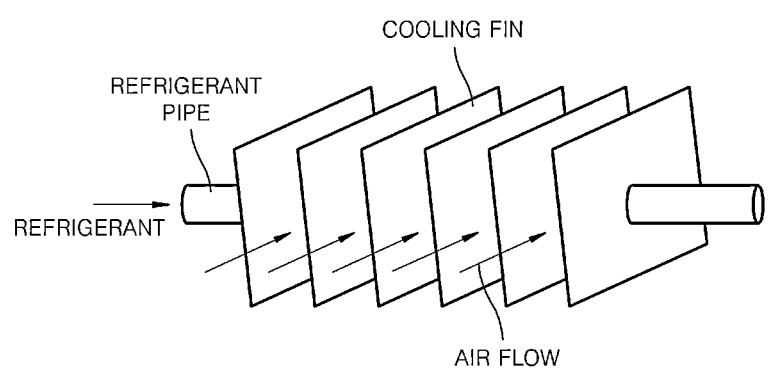
FIG. 1 is a schematic view of a related heat exchanger used in a refrigerator.
Figure 2A:
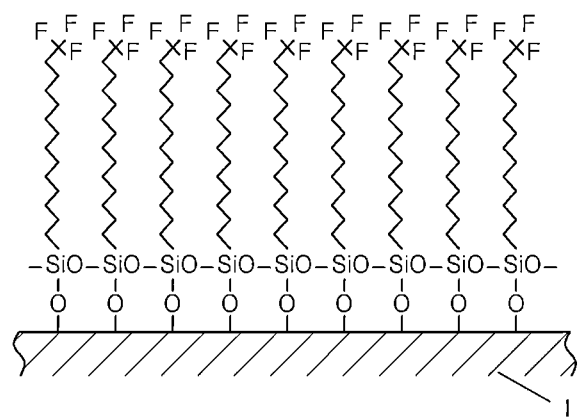
FIGS. 2A, 2B, 2C, and 2D are views illustrating related techniques for providing a hydro-repellent property to a heat exchanger.
Figure 2B:
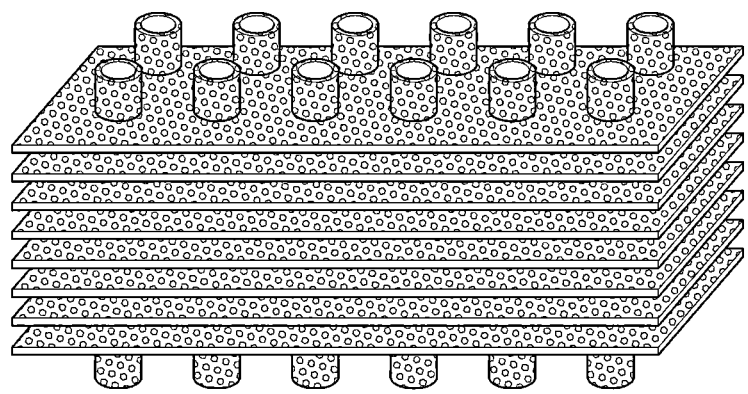
Figure 2C:
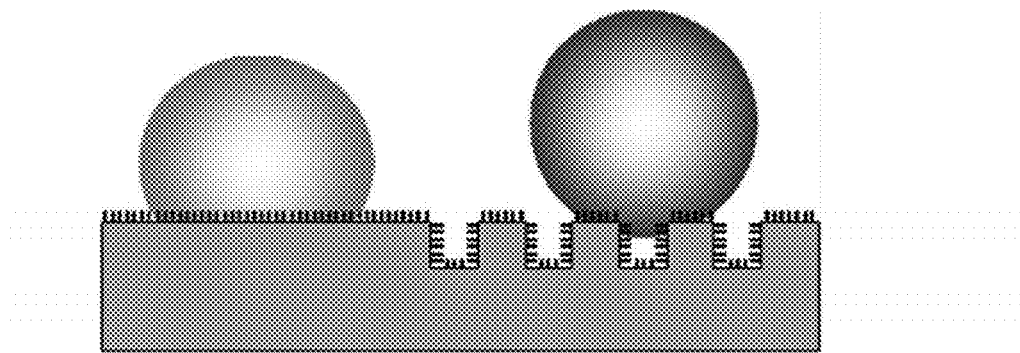
Figure 2D:
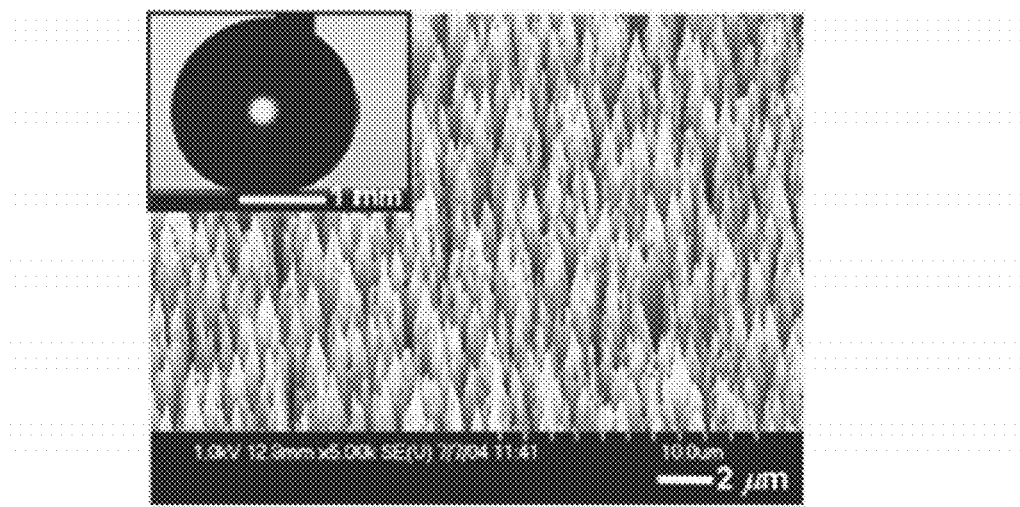

Hereinafter, the present invention will be described in detail.

A super-hydrorepellent coating composition according to an embodiment of the present invention includes a nano structure, a polyorganosiloxane, a cross-linker, and a catalyst.

The polyorganosiloxane includes a siloxane repeating unit represented by Formula 1, and has a weight average molecular weight of about 200 to about 300,000.

$$-SiR^1R^2O-$$  <Formula 1> wherein $R^1$ and $R^2$ are each independently a substituted or unsubstituted C1 to C10 alkyl group, a substituted or unsubstituted C1 to C10 alkoxy group, a substituted or unsubstituted C2 to 010 alkenyl group, or a substituted or unsubstituted C6 to C20 aryl group.

Siloxane repeating units may be combined in various manners to form a cyclic, linear, or branched structure, and the polyorganosiloxane may be a monopolymer, a copolymer, or a mixture thereof. That is, the polyorganosiloxane may include two or more different types of siloxane repeating units by changing a substituent linked to Si in the repeating unit represented by Formula 1.

The siloxane repeating unit contained in the polyorganosiloxane may be a dialkylsiloxy group in which respective alkyl groups may be the same as or different from each other, an alkenylmethylsiloxy group, or an alkyiphenylsiloxy group. The polyorganosiloxane may include an appropriate terminal group, and examples of the terminal group may include a trialkylsiloxy group and an alkenyldialkylsiloxy group.

The substitutions described above will now be defined in detail.

"Alkyl group" refers to a linear or branched saturated C1 to C10 or C1 to C6 monovalent hydrocarbon moiety. The alkyl group may be substituted with at least one kind of material selected from a halogen atom, a hydroxy group, a nitro group, a cyano group, and a substituted or unsubstituted amino group. Examples of the alkyl group include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, and bromomethyl.

"Alkoxy group" refers to a radical —O-alkyl, and alkyl is the same as described above. Examples of the alkoxy group include methoxy, ethyoxy, propoxy, isobutyloxy, sec-butyloxy, pentyloxy, iso-amyloxy, and hexyloxy, and one or more hydrogen atom of the alkoxy group may be substituted with the same substituents described in connection with the alkyl group.

"Alkenyl group" refers to a linear or branched C2 to C10 or C2 to C6 monovalent hydrocarbon moiety having one or more carbon-carbon double bond. The alkenyl group may be linked through a carbon atom containing a carbon-carbon double bond or a saturated carbon atom. The alkenyl group may be substituted with the same substituents described in connection with the alkyl group. Examples of the alkenyl group include ethenyl, 1-prophenyl, 2-prophenyl, 2-butenyl, 3-butenyl, pentenyl, 5-hexenyl, and dodecenyl.

"Aryl group" refers to a monovalent monocyclic, bicyclic, or tricyclic aromatic hydrocarbon moiety containing 6 to 20, or 6 to 12 ring atoms, and the aryl group may be substituted with the same substituents described in connection with the alkyl group. In the aryl group, an aromatic part contains only carbon atoms. Examples of the aryl group include phenyl, naphthalenyl, and fluorenyl.

The polyorganosiloxane may include at least one kind of material selected from the group consisting of polydimethylsiloxane, polymethyiphenylsiloxane, polydiphenylsiloxane, polyfluorinesiloxane, and polyvinylsiloxane, and a copolymer or combination thereof.

Examples of the polyorganosiloxane include vinyldimethylsiloxy-terminal blocked polydimethylsiloxane(divinylpolydimethylsiloxane), vinylmethylhydroxysiloxy-terminal blocked polydimethylsiloxane, a vinyldimethylsiloxy-terminal blocked dimethylsiloxane-vinylmethylsiloxane copolymer, vinylmethylhydroxysiloxy-terminal blocked dimethylsiloxane-vinylmethylsiloxane copolymer, and a vinyldimethylsiloxy-terminal blocked dimethylsiloxane-methylphenylsiloxane-vinylmethylsiloxane copolymer.

The nano structure may have a wire shape, a tube shape, a fiber shape, or a combination thereof, each of which has a nano diameter.

The nano structure may have a diameter of, for example, about 1 to about 1,000 nm, about 5 to about 500 nm, or about 10 to about 100 nm, and a length of about 0.01 to about 1,000 μm, about 1 to about 500 μm, or about 10 to about 100 μm. If the diameter and length of the nano structure are within the ranges described above, the nano structure may easily disperse in the coating composition, and when the super-hydrorepellent coating layer is formed later, a protrusion structure may be easily formed outside of the coating layer and a part of the nano structure may be immersed inside the polyorganosiloxane. Thus, loss of the nano structure by attachment and detachment is prevented, and a portion of the nano structure protrudes to the outside of the coating layer which enables easy formation of a super-hydrorepellent surface by the protrusion structure.

The nano structure may include at least one kind of nano structure selected from the group consisting of a carbon nanotube (CNT), a carbon nanofiber, a Si nanowire, a ZnO nanowire, a Cu nanowire, and a GaN nanowire.

The CNT may be a multiwall CNT or a singlewall CNT.

The amount of the nano structure may be in the range of, for example, about 0.1 to about 500 parts by weight, about 1 to about 100 parts by weight, about 3 to about 50 parts by weight, based on 100 parts by weight of polyorganosiloxane. If the amount of the nano structure is within the range described above, the dispersibility of the nano structure with respect to the polyorganosiloxane is improved and a coating process may be easily performed and a surface of the coating layer may retain a super-hydrorepellent property.

The cross-linker cures the coating composition by cross-linking with polyorganicsiloxane, thereby enabling formation of a super-hydrorepellent coating layer on a desired substrate. The cross-linking may occur by condensation of the cross-linker and a silanol (Si—OH) that is a terminal group of the polyorganosiloxane or by addition-reaction of the cross-linker and a vinyl group-containing polyorganosiloxane.

The cross-linker may be a silane-based compound, or an organohydrogensiloxane-based compound having a Si—H bond.

Examples of a silane-based compound include alkoxy silane, amino silane, vinyl silane, epoxy silane, metacryl silane, alkyl silane, phenyl silane, and chloro silane. Examples of a organohydrogensiloxane-based compound having a Si—H bond include pentamethyltrihydrogencyclotetrasiloxane, 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, a methylhydrogencyclopolysiloxane, methylhydrogensiloxane•dimethylsiloxane cyclic copolymer, a both terminal trimethylsiloxy groups-blocked methylhydrogenpolysiloxane, a both terminal trimethylsiloxy groups-blocked dimethylsiloxane•methylhydrogensiloxane copolymer, a both terminal dimethylhydrogensiloxy groups-blocked dimethylpolysiloxane, a both terminal dimethylhydrogensiloxy groups-blocked dimethylsiloxane•methylhydrogensiloxane copolymer, a both terminal trimethylsiloxy groups-blocked methylhydrogensiloxane•diphenylsiloxane copolymer, a both terminal trimethylsiloxy groups-blocked methylhydrogensiloxane•diphenylsiloxane•dimethylsiloxane copolymer, a both terminal trimethylsiloxy groups-blocked methylhydrogensiloxane•methylphenylsiloxane•dimethylsiloxane copolymer, a both terminal dimethylhydrogensiloxy groups-blocked methylhydrogensiloxane•dimethylsiloxane•diphenylsiloxane copolymer, a both terminal dimethylhydrogensiloxy groups-blocked methylhydrogensiloxane•dimethylsiloxane•methylphenylsiloxane copolymer, a copolymer containing a $(CH_3)_2HSiO_{1/2}$ unit and a $(CH_3)_3SiO_{1/2}$ unit and a $SiO_{4/2}$ unit, a copolymer containing a $(CH_3)_2HSiO_{1/2}$ unit and a $SiO_{4/2}$ unit, and a copolymer containing a $(CH_3)_2HSiO_{1/2}$ unit and a $SiO_{4/2}$ unit and a $(C_6H_5)_3SiO_{1/2}$ unit.

The amount of the cross-linker may be in the range of, for example, about 1 to about 200 parts by weight, about 3 to about 100 parts by weight, or about 5 to about 50 parts by weight, based on 100 parts by weight of polyorganosiloxane.

The catalyst may be any substance that facilitates cross-linking of a polysiloxane-containing composition.

The catalyst may be a metallic or non-metallic catalyst. The catalyst may vary according to the cross-linking reaction type of the polyorganosiloxane. For example, if the cross-linking is performed by condensation, the catalyst may be a tin compound, a titanium compound, a zirconium compound, a lead compound, an iron compound, a cobalt compound, an antimony compound, a manganese compound, a bismuth compound, or a zinc compound, and if the cross-linking is performed by addition-reaction, the catalyst may be a platinum group metal-based compound such as a platinum compound, a palladium compound, or a rhodium compound.

Examples of a tin compound include dibutyltindilaurate, dibutyltindiacetate, dibutyltindimethoxide, tinoctoate, isobutyltintriceroate, dibutyltinoxide, solubilized dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutylate, dimethyltin di-neodecanoate, triethyltin tartarate, dibutyltin dibenzoate, tin oleate, tin naphthenate, butyltintri-2-ethylhexylhexoate, and tinbutyrate, and equivalents thereof.

Examples of a titanium compound include di(isopropoxide) titanium bis(ethylacetoacetate) [Dupont; Tyzor DC]; di(isobutoxide) titanium bis(ethylacetoacetato) [Johnson Matthey; Vertec KE6]; di(n-butoxide) titanium bis(ethylacetoacetato) [Johnson Matthey]; 1,3-propanedioxytitanium bis(ethylacetoacetate); titanium (triethanolaminato)isopropoxide [Dupont; Tyzor TE]; bis(triethanolamino) titanium di (methyl diglycolate) [Sanmar; Isocat ETAM]; titanium diisopropoxide (bis-2,4-pentanedionate) [Dupont; Tyzor AA]; titanium ethoxide isopropoxide bis-(2,4-pentanedionate) [Sanmar; Isocat AA 65]; titanium bis-(2,4-pentanedionate) (2-EHA) [Johnson Matthey; Vertec XLIOO]; and tetra-alkyl titanates such as tetra n-butyl titanate or tetra-isopropyl titanate, and equivalents thereof.

Examples of a platinum group metal-based compound include chloroplatinic acid, alcohol-modified chloroplatinic acid, or coordination compounds of chloroplatinic acid with olefins, vinylsiloxane, or an acetylene compound, tetrakis(triphenylphosphine)palladium, and chlorotris(triphenylphosphine)rhodium.

The super-hydrorepellent coating composition may further include a filler. The filler may protrude to the outside of a coating layer after the coating layer is formed and then surface-treated, and thus, provides an uneven structure to the coating layer. As a result, a contact angle of a waterdrop on the coating layer is increased, that is, a contact area of a waterdrop is reduced, and a hydro-repellent property is enhanced. In addition, the use of the filler leads to an improvement in the heat resistance and freezing resistance of a coating layer of a silicon structure formed using polyorganosiloxane.

In addition, the filler may include one or more kind of filler selected from a filler having a micro diameter and a filler having a nano diameter. If the filler includes the filler having a micro diameter and the filler having a nano diameter, an outer surface of the coating layer may have a micro-nano complex structure, that is, a fractal surface structure, thereby increasing a contact angle of a waterdrop compared to when the filler having a micro diameter and the filler having a nano diameter are used separately.

The filler may be any powder that allows a surface of the coating layer to have a micro uneven structure. Examples of the filler include silica, quartz, titanium dioxide, magnesium oxide, zinc oxide, iron oxide, zirconium oxide, aluminum oxide, magnesium carbonate, calcium carbonate, zinc carbonate, layered mica, carbon black, diatomaceous earth, and a combination thereof. In this regard, the silica may be micronized silica, crystallized silica, fumed silica, pyrogenic spherical silica, or the like.

The specific surface area of the filler (evaluated according to a BET method) may be, for example 50 $m^2/g$ or more, in the range of 10 to 400 $m^2/g$, or 50 to 300 $m^2/g$, and if the specific surface area of the filler is within the range described above, a reinforcement property of silicon rubber may be further improved.

In addition, the fillers described above may be further surface-treated with an organo silicon compound such as an organoalkoxysilane compound, an organochlorosilane compound, an organosilazane compound, and a low molecular weight siloxane compound. Furthermore, silicon rubber powder and silicon resin powder may also be used as the filler. Use of the micronized silica, the crystallized silica, the pyrogenic spherical silica, the silicon rubber powder, and the silicon resin powder may lead to a lower coefficient of volume expansion and a higher durability of the super-hydrorepellent coating layer.

Examples of the organo silicon compound for surface-treating the filler include: silazanes such as hexamethyldisilazane; silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane, or chloropropyltrimethoxysilane; polymethylsiloxane, and organohydrogenpolysiloxane.

The amount of the filler may be in the range of, for example, about 1 to about 100 parts by weight, about 10 to about 70 parts by weight, or about 20 to about 50 parts by weight based on 100 parts by weight of polyorganosiloxane. If the amount of the filler is within the ranges described above, the filler may retain dispersibility in the coating composition, the coating layer may be easily formed, and the hydro-repellent property and heat resistance of the coating layer may be enhanced.

A method of forming a super-hydrorepellent coating layer according to an embodiment includes coating a super-hydrorepellent coating composition containing the nano structure described above on a mother substance and curing the formed coating layer.

The mother substance to which the composition is capable of being applied may be enamel, glass, or metal such as aluminum or stainless steel.

The coating may be spin coating, spray coating, laminating, dip coating, flow coating, roll coating, or screen printing, but is not limited thereto.

The coating thickness may vary according to where the mother substance is to be used. For example, when the mother substance is coated on a cooling fin of a heat exchanger, the coating thickness may be controlled to be in the range of, for example about 1 to about 10 µm, or about 3 to about 5 µm so as to minimize a decrease in a heat exchange efficiency of the cooling fin.

In addition, optionally, before the coating composition is used for coating, a ultrasonic dispersion treatment may be performed to uniformly disperse the nano structure, the filler, and the like in the coating composition. In this regard, a dispersant may be further used to increase dispersibility of the nano structure.

Then, the coated composition may be dried and/or cured.

The drying may be performed at a temperature in the range from room temperature to 100° C. for about 5 minutes to about 24 hours. In another embodiment, the drying may not be performed.

The curing of the coated cured product may be, for example, a thermal curing by condensing a silanol group by heating at a temperature equal to or lower than a denaturalization temperature of the mother substance. When an organic substituent contains a (meth)acryl group or a mercapto group, a vinyl group, an epoxy group, a radioactive ray curing method such as UV curing, or EB curing may be used. In addition, the curing may be performed by ring-opening polymerization of an epoxy group.

If the organic substituent contains a SiH group and a vinyl group, any known curing method such as a curing method in which cross-linking occurs by performing a hydrosilylation reaction in the presence of a transition metal compound such as a platinum group metal compound.

In regard to a thermal curing method, the curing temperature may be in the range of, for example, 30 to 200° C., or 60 to 120° C., and the curing time may be, for example 1 to 120 minutes, or 3 to 10 minutes.

In addition, when a curing promoter is added to the coating composition, the drying temperature may be lowered and the drying time may be reduced.

Examples of a curing promoter include an organo tin compound such as dibutyltindiraulate, dibutyltindiacetate, or octyltintrisraulate, and an organic acid salt such as sodium acetic acid, sodium formic acid, or potassium propionic acid. The amount of the curing promoter may be in the range of 0.001 to 1.0 parts by weight based on 100 parts by weight of a coating composition.

When curing is performed by irradiation of ultraviolet rays (UV), a light source used may be a high-pressure mercury lamp or a metallic halide lamp. In this regard, a photo polymerization initiator may be added to the coating composition in an amount of 0.5 to 10 parts by weight, or 1 to 5 parts by weight, based on 100 parts by weight of the coating composition, and then, the coating composition is coated on a substrate, and 200 to 1,200 milijouls of UVs are irradiated thereto to cure the formed coating layer.

When the coating is spray coating, the coating composition layer formed on the mother substance is not smooth and has an irregular surface. Thus, even without use of a separate surface treatment, an end of nano structure that has been dispersed in the coating composition may protrude to the outside of the cured product.

Figure 3:
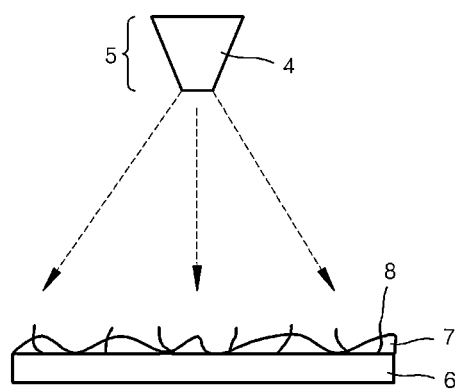
FIG. 3 is a view to explain a method of forming a super-hydrorepellent coating layer according to an embodiment.

That is, referring to FIG. 3, when a super-hydrorepellent coating composition 4 is spray-coated on a mother substance 6 using a spray gun 5, a cured product 7 may have an irregular surface and accordingly, an end of a nano structure 8 protrudes to the outside of the cured product 7.

However, when other coating methods are used, a cured product of the coating composition has a smooth surface. That is, only with the coating, an end of the nano structure may not protrude to the outside of the cured product of the coating composition. Thus, a surface treatment may be further performed following the curing so as to protrude an end of the nano structure to the outside of the cured product.

The surface treatment may be a process in which a smooth top surface of the formed cured product is etched to allow an end of the nano structure dispersed in the cured product or a surface of the filler to protrude the outside of the cured product. As a result, due to the protrusion of the nano structure or filler to the outside of the cured product, an uneven structure is formed in the coating layer, and a contact surface of a waterdrop with respect to a surface of the formed coating layer is reduced, thereby providing a super-hydrorepellent property to the mother substance on which the coating layer is formed thereon.

The surface treatment may be any method that etches a surface of the cured product of a polyorganosiloxane-containing composition. Examples of the surface treatment include a plasma etching treatment or a wet etching treatment.

Figure 4A:
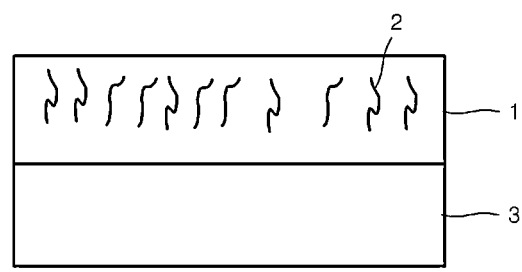
FIGS. 4A and 4B are views to explain a method of forming a super-hydrorepellent coating layer according to another embodiment.
Figure 4B:
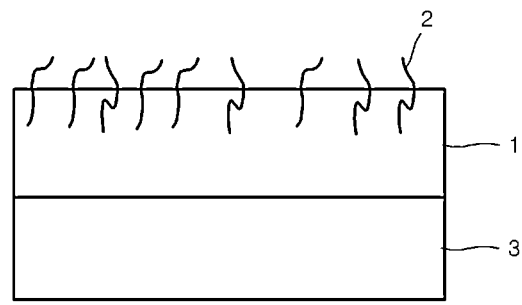

FIG. 4A is a sectional view of a coating layer including a nano structure 2, formed by coating the coating composition on a mother substance 3, and FIG. 4B is a sectional view of a super-hydrorepellent coating layer that has been surface-treated, wherein an end of the nano structure 2 protrudes to the outside of a cured product 1 by the surface treatment.

A super-hydrorepellent coating layer according to an embodiment of the present invention includes a cured product of a super-hydrorepellent coating composition that contains a nano structure, polyorganosiloxane, a cross-linker, and a catalyst, wherein the nano structure protrudes to the outside of the cured product.

The cured product may be silicon rubber, silicon oil, or silicon resin.

In addition, the cured product may further include a filler, in addition to the nano structure. The filler may be located inside the cured product, or may protrude to the outside of the cured product.

The nano structure and filler which protrude to the outside of the cured product provide an uneven structure to a surface of a formed coating layer and the uneven structure leads to a decrease in a surface area of a waterdrop. Thus, due to the decreased surface area together with the hydro-repellent property of silicon itself that constitutes the cured product, excellent super-hydrorepellent properties may be embodied.

A heat exchanger according to an embodiment of the present invention includes the super-hydrorepellent coating layer described above formed on the surface thereof.

The heat exchanger may be used in any electric home appliance that is used at low temperature and is thus likely to frost, in addition to a refrigerator and a freezer.

That is, when a hydro-repellent material is coated on a heat exchanger, dew-laden and formation of ice may be prevented, thereby smoothly performing heat-exchange. In addition, since a heater is not used, the manufacturing costs are decreased and the manufacturing process is simplified. Moreover, a freezing device including the heat exchanger has higher efficiency, is easily manufactured, and has less trouble in use.

One or more embodiment will be described in further detail with reference to the following examples. These examples are for illustrative purposes only and are not intended to limit the scope of the present invention.

<Preparation of Super-Hydrorepellent Coating Composition>

Example 1-1

40 parts by weight of multiwall CNTs having an average diameter of 13 nm and an average length of 15μm were mixed with a liquid silicon rubber (purchased from Shinetsu company) including 100 parts by weight of divinylpolydimethylsiloxane, 7 parts by weight of dimethylsiloxane methylhydrogensiloxane copolymer, and 0.01 parts by weight of platinum group metal-based catalyst in a 3-liter beaker to prepare a super-hydrorepellent coating composition.

Example 1-2

A super-hydrorepellent coating composition was prepared in the same manner as in Example 1-1, except that 20 parts by weight of CNTs were used.

Example 1-3

A super-hydrorepellent coating composition was prepared in the same manner as in Example 1-1, except that 10 parts by weight of CNTs were used, and 33 parts by weight of silica and 2 parts by weight of iron oxide ($Fe_2O_3$) were further used.

Example 1-4

A super-hydrorepellent coating composition was prepared in the same manner as in Example 1-1, except that 8 parts by weight of CNTs were used, and 33 parts by weight of silica and 2 parts by weight of iron oxide ($Fe_2O_3$) were further used.

<Formation of Super-Hydrorepellent Coating Layer>

Example 2-1

50 parts by weight of a dispersant (manufacturer: Roche, product name: Triton X-100) was added to the coating composition prepared according to Example 1-1, and then the mixture was dispersed using an ultrasonic wave dispersing device for about 120 to 180 minutes.

The dispersed composition was loaded into a spray coater and then spray-coated on an aluminum fin of a heat exchanger included in a refrigerator (manufacturer: Samsung Electronics Co., Ltd, product name: SR562YC), thereby forming a coating layer having a thickness of about 3 to about 5 μm.

Then, the coating layer was cured in an oven at a temperature of 120° C. for about 45 minutes to form a super-hydrorepellent coating layer having CNTs in a nanostructure that protruded to the outside of the silicon rubber coating layer.

Example 2-2

A super-hydrorepellent coating layer was formed on a heat exchanger in the same manner as in Example 2-1, except that the super-hydrorepellent coating composition prepared according to Example 1-2.

Example 2-3

A super-hydrorepellent coating layer was formed on a heat exchanger in the same manner as in Example 2-1, except that the super-hydrorepellent coating composition prepared according to Example 1-3.

Example 2-4

50 parts by weight of a dispersant (manufacturer: Roche, product name: Triton X-100) was added to the super-hydrorepellent coating composition prepared according to Example 1-3 and then, the mixture was dispersed using an ultrasonic wave dispersing device for about 120 to 180 minutes.

Then, the dispersed composition was spray-coated on an aluminum fin of a heat exchanger included in a refrigerator (manufacturer: Samsung Electronics Co., Ltd, product name: SR562YC) by lamination, thereby forming a coating layer having a thickness of about 3 to 5 μm.

Then, the coating layer was cured in an oven at a temperature of 120° C. for about 45 minutes to form a silicon rubber coating layer having a smooth surface in which CNTs are dispersed.

Then, the surface of the silicon rubber coating layer was dipped in 50% trifluoroacetic acid aqueous solution for 10 seconds to wet-etch the silicon rubber coating layer.

As a result, a super-hydrorepellent coating layer having CNTs whose nanostructure protruded to the outside of the silicon rubber coating layer was formed.

Comparative Example 1

A super-hydrorepellent coating composition was prepared in the same manner as in Example 1-3, except that CNTs were not used.

Then, a super-hydrorepellent coating composition was formed in the same manner as in Example 2-1, except that the prepared super-hydrorepellent coating composition was used.

Comparative Example 2

A super-hydrorepellent coating composition was prepared in the same manner as in Example 1-3, except that 8 parts by weight of CNTs were used.

Then, a super-hydrorepellent coating composition was formed in the same manner as in Example 2-4, except that the prepared super-hydrorepellent coating composition was used, and a silicon rubber coating layer having a smooth surface and an additional surface-wet-etching treatment was not performed.

<Evaluation of Contact Angle>

Contact angles of the super-hydrorepellent coating layers formed according to Examples 2-1 to 2-4, Comparative Examples 1 and 2 were measured by using a contact angle meter (Surface Electro Optics, Korea). The results are shown in Table 1.

TABLE 1

| Coating layer | Contact angle |
| --- | --- |
| Example 2-1 | 150° |
| Example 2-2 | 150° |
| Example 2-3 | 144° |
| Example 2-4 | 150° |
| Comparative Example 1 | 119° |
| Comparative Example 2 | 121° |

Referring to Table 1, the super-hydrorepellent coating layers formed according to Examples 2-1 to 2-4 have a larger contact angle than the coating layers formed according to Comparative Examples 1 and 2 in which the nano structure is not included, or even when the nano structure is included, the nano uneven structure protruding to the outside of a cured product formed by surface-treatment is not formed and thus, show super-hydrorepellent properties.

<Observation of Contact Shape Between Surface of Coating Layer and Waterdrop>

Figure 5A:
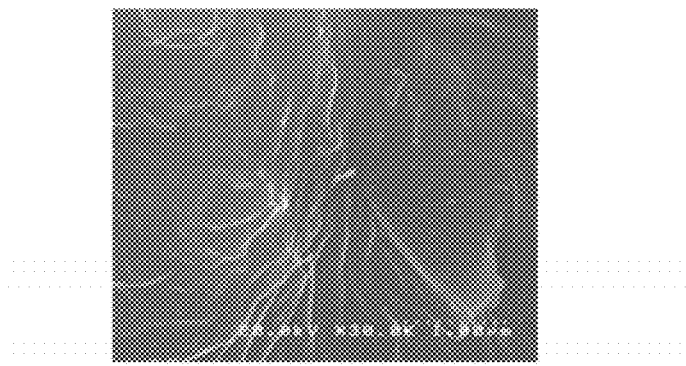
FIG. 5A is a scanning electron microscope (SEM) image of a surface of a coating layer formed according to Example 2-1.

FIG. 5A is a scanning electron microscope (SEM) image of a surface of a coating layer formed according to Example 2-1. In the SEM image, CNTs have a protrusion structure.

Figure 5B:
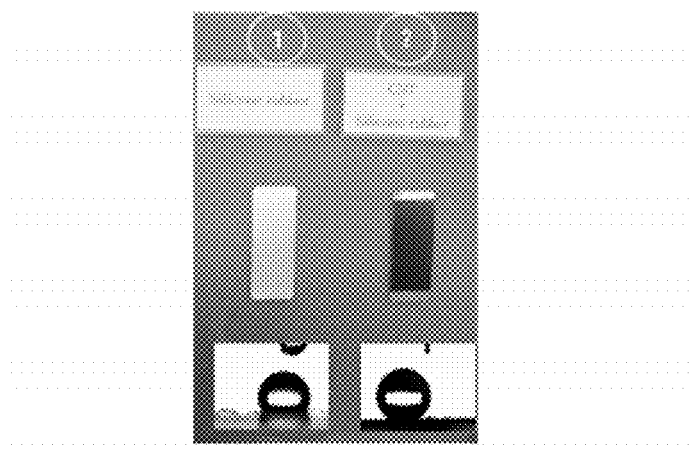
FIG. 5B shows pictures showing a contact state of a waterdrop and a coating layer formed according to Example 2-1 (②, the picture on the bottom right) and a contact state of a waterdrop and a coating layer formed according to Comparative Example 1 (①, the picture on the bottom left)

FIG. 5B shows pictures showing a contact state of a waterdrop and the coating layer formed according to Example 2-1 (②, the picture on the bottom right) and a contact state of a waterdrop and the coating layer formed according to Comparative Example 1 (①, the picture on the bottom left). Referring to FIG. 5B, the contact area of a waterdrop on the surface of CNTs having the protrusion structure is much smaller than that of a waterdrop on the coating layer of Comparative Example 1 which does not have the protrusion structure.

Figure 6A:
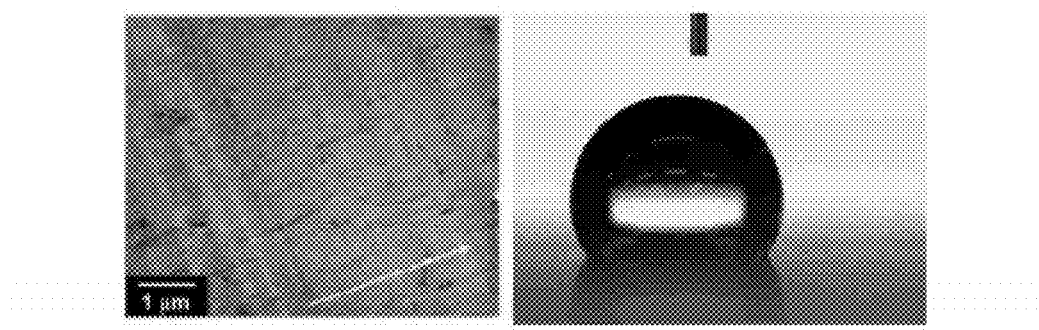
FIGS. 6A and 6B show pictures showing a contact state of a waterdrop and coating layers formed according to Comparative Example 2 and Example 2-4.
Figure 6B:
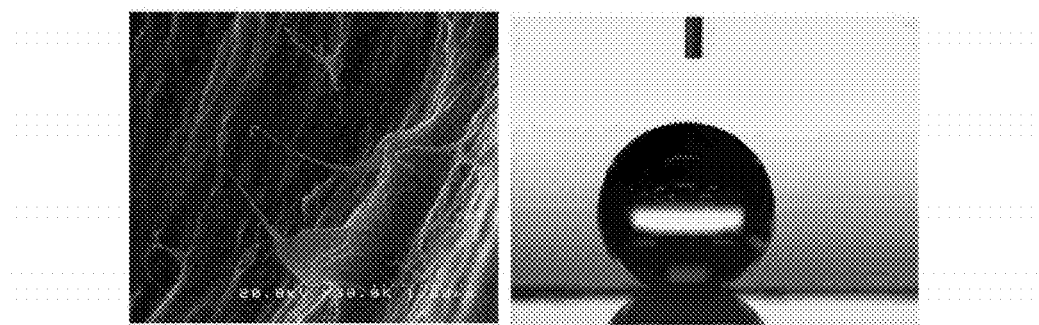

FIGS. 6A and 6B show pictures showing a contact state of a waterdrop and coating layers formed according to Comparative Example 2 and Example 2-4. Referring to FIGS. 6A and 6B, the contact area of a waterdrop on the coating layer of Example 2-4 that has been surface-treated by wet-etching to form the protrusion structure of CNTs (see FIG. 6B) is much smaller than that of a waterdrop on the coating layer of Comparative Example 2 which has not been surface-treated and thus has a smooth surface (see FIG. 6A).

<Frosting/Defrosting Evaluation of Super-Hydrorepellent Coating Layer>

Figure 7:
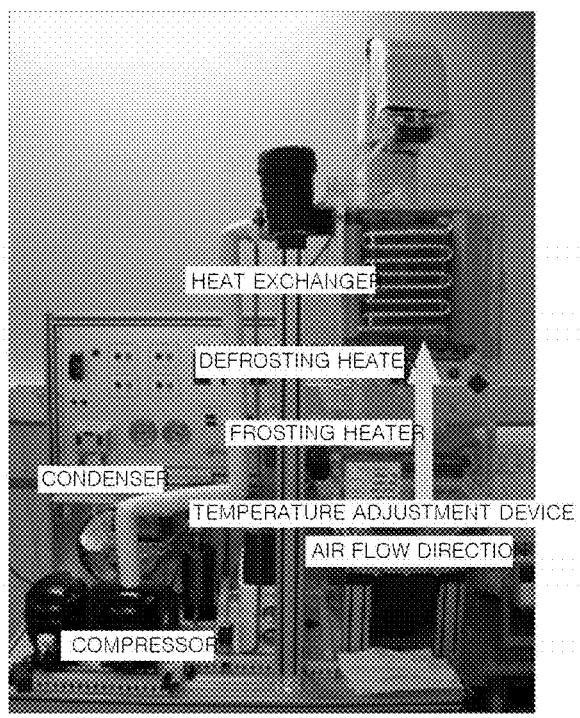
FIG. 7 is a picture showing a frosting/defrosting evaluation system of a heat exchanger.

FIG. 7 is a picture showing a frosting/defrosting evaluation system of a heat exchanger of a refrigerator. Referring to FIG. 7, the frosting/defrosting evaluation system has a refrigerant circulation structure that consists of a compressor, a condenser, a heat exchanger, and the like. The frosting/defrosting evaluation system further includes a temperature adjustment device for controlling the temperature of air entering into the heat exchanger, a humidifier for inducing frosting, and a defrosting heater for defrosting located under the heat exchanger. When the temperature of the heat exchanger equal to or lower than a freezing point, water-containing air is frosted on a surface of the heat exchanger. Since the frosting results in a decrease in the heat exchange efficiency of the heat exchanger, the defrosting heater is driven to remove frosts from the surface of the heat exchanger, and thus a waterdrop remains on the surface of the heat exchanger. The waterdrop, however, is frozen again when the compressor is driven and the temperature of the heat exchanger is decreased, and acts as a resistor against air flow, and thus, the efficiency of the heat exchanger is reduced. Accordingly, it is better to completely remove waterdrops from the surface of a tube or fin of the heat exchanger. In addition, the shorter defrosting time the formed frosts have, the lower power consumption a heater for defrosting requires. Thus, a short defrosting time is considered to be a critical factor in terms of system efficiency.

By using heat exchangers including the coating layers formed according to Example 2-3 and 2-4, the frosting and defrosting described above were repeatedly performed and evaluation results of a contact state and a contact angle of a waterdrop on the coating layers, and images of surfaces of the coating layers are shown in FIGS. 8A, 8B, 9A, and 9B.

In regard to the frosting/defrosting evaluation system, when the compressor was driven, the surface temperature of the heat exchanger was about −30° C., and the temperature of the defrosting heater was 70° C., and the compressor was set to stop once the defrosting heater was driven and defrosting begun.

Figure 8A:
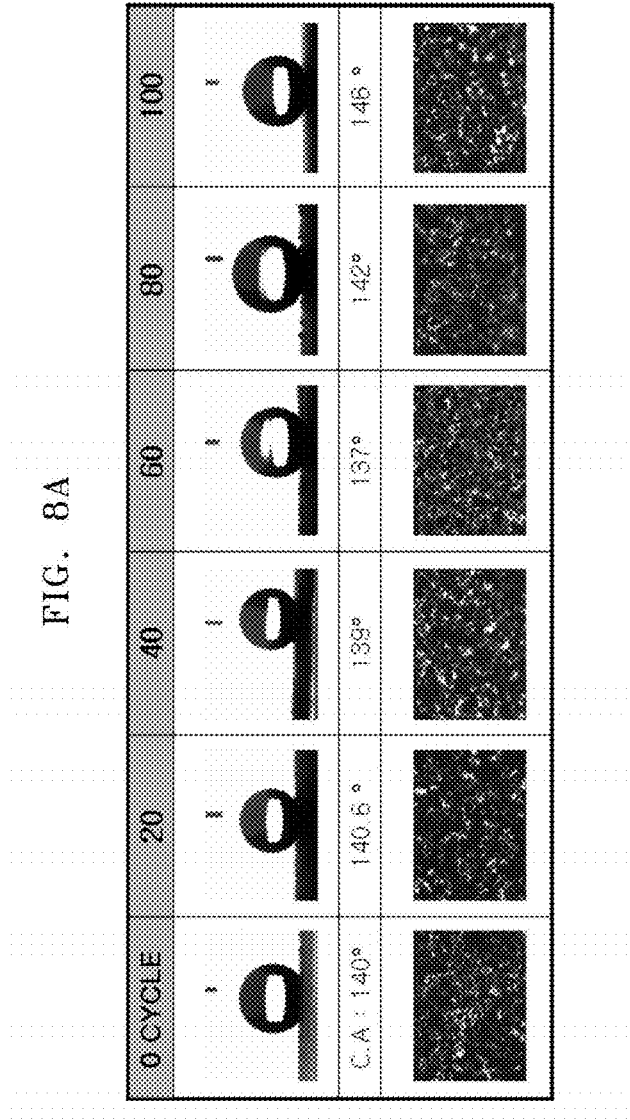
FIG. 8A shows pictures showing a contact state of a waterdrop and a surface of a coating layer formed according to Example 2-1, when a frosting/defrosting cycle is repeated 100 times with respect to a heat exchanger including the coating layer.
Figure 8B:
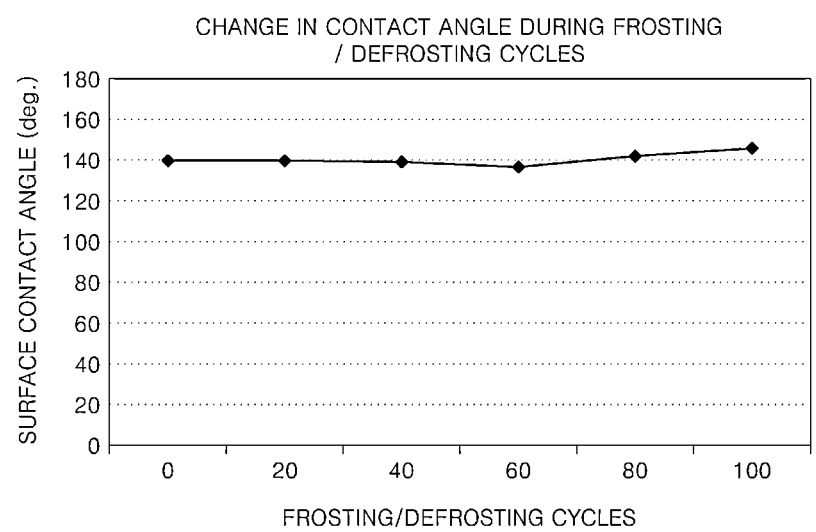
FIG. 8B is a graph of a surface contact angle of a waterdrop on a surface of a coating layer formed according to Example 2-1.

Referring to FIGS. 8A and 8B, even when a frosting/defrosting cycle is repeated 100 times with respect to a heat exchanger including the coating layer formed according to Example 2-1, a contact state of a waterdrop and the surface of the coating layer do not change, and the contact angle maintains in the range of 139° to 146°.

Figure 9B:
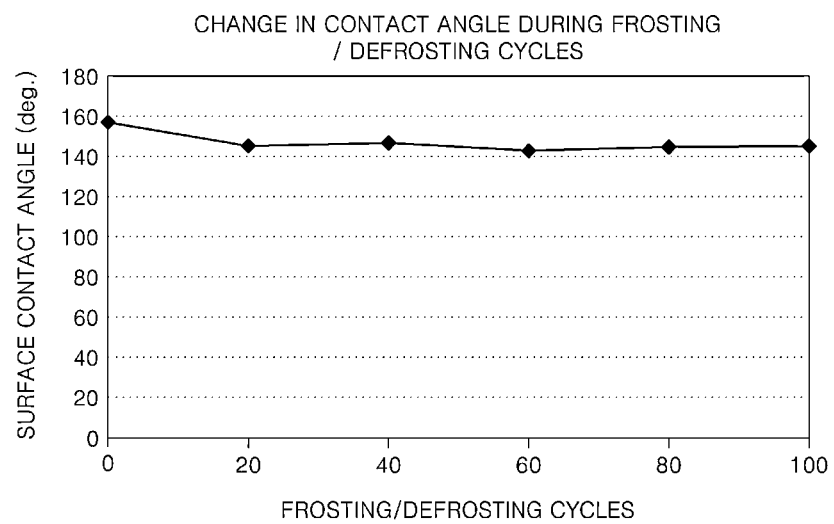
FIG. 9B is a graph of a surface contact angle of a waterdrop on a surface of a coating layer formed according to Example 2-4.

In addition, referring to FIGS. 9A and 9B, like the results in regard to Example 2-1 described above, when a frosting/defrosting cycle is repeated 100 times with respect to a heat exchanger including the coating layer formed according to Example 2-4, a contact state of a waterdrop and the surface of the coating layer do not change, and the contact angle maintains in the range of 140° to 150°.

In consideration of the results described above, it can be identified that a coating layer according to an embodiment of the present invention retains its original super-hydrorepellent properties even when exposed to 100 or more cycles of frosting and defrosting and has high durability with respect to super-hydrorepellent properties.

<Comparison Evaluation of Portion of Heat Exchanger that Includes Super-Hydrorepellent Coating Layer and Portion of Heat Exchanger that Does Not Include Super-Hydrorepellent Coating Layer>

(1) Defrosting Effects

Figure 10A:
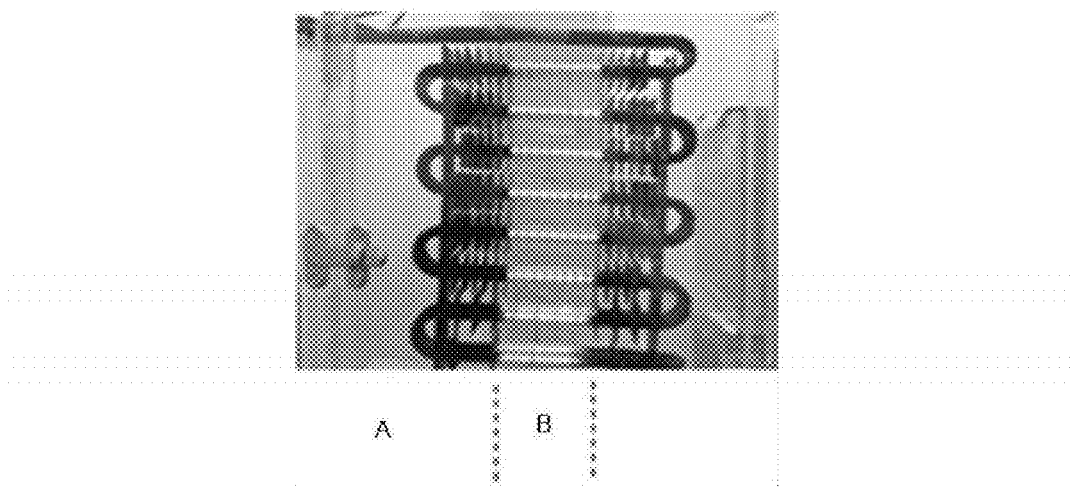
FIGS. 10A, 10B, and 10C are pictures showing defrosting effects of a part of a heat exchanger including a super-hydrorepellent coating layer and another part that does not include the super-hydrorepellent coating layer.
Figure 10B:
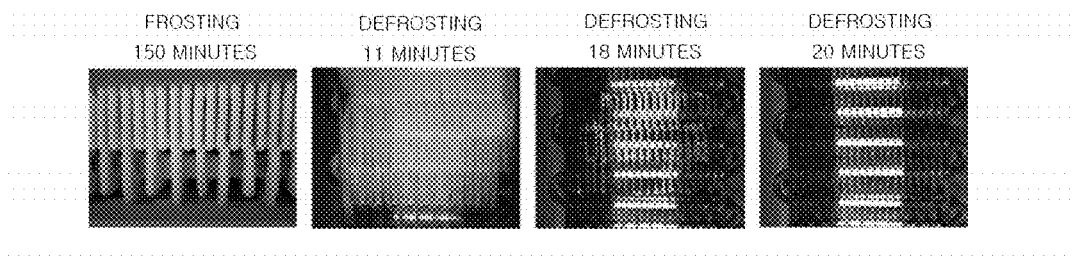
Figure 10C:
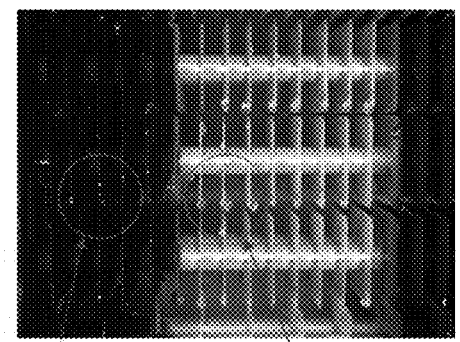

FIGS. 10A, 10B, and 10C are pictures showing defrosting effects of a part of a heat exchanger including a super-hydrorepellent coating layer and another part that does not include the super-hydrorepellent coating layer.

First, aluminum fins of the heat exchanger were divided into three groups: a left group, a right group, and a center group. The left and right groups included the super-hydrorepellent coating layer formed according to Example 2-3 (see A of FIG. 10A), and the center group did not include the super-hydrorepellent coating layer (see B of FIG. 10A).

The coated heat exchanger was mounted into the frosting/defrosting evaluation system and then the compressor was driven to freeze the heat exchanger and frosting began by controlling a humidifier and the temperature adjustment device to adjust humidity and temperature of the heat exchanger. 150 minutes after the frosting began, a space between fins of the heat exchanger was completely filled with frosts. Immediately after the complete filling, the defrosting heater was driven to begin defrosting. 18 minutes after the defrosting began, the right and left groups were almost completely defrosted but the center group was incompletely defrosted. The complete defrosting of the center group further required about 20 minutes (see FIG. 10B).

In addition, referring to FIG. 10C, in regard to residual water on the surface of the heat exchanger after the defrosting was completely performed, when the coating layer was not formed (see D of FIG. 10C), big waterdrops were formed on ends of cooling fins, on the other hand, when the coating layer was formed (see C of FIG. 10C), the residual waterdrop was not formed.

(2) Frosting Delay Effects

Figure 11A:
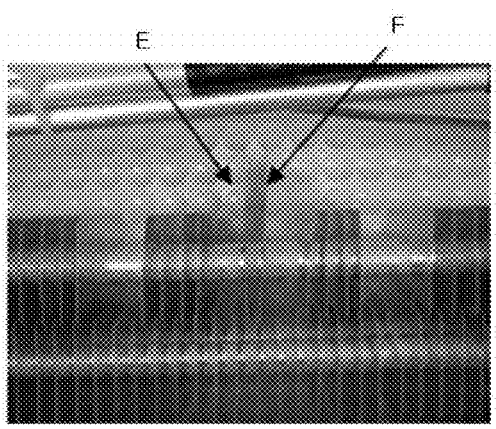
FIGS. 11A, 11B, and 11C are pictures showing frosting delay effects of a part of a heat exchanger including a super-hydrorepellent coating layer and another part that does not include the super-hydrorepellent coating layer.
Figure 11B:
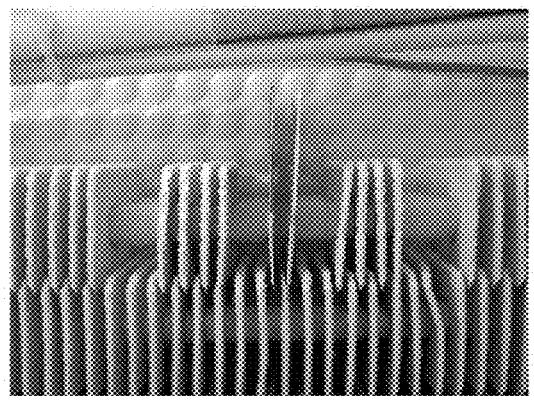
Figure 11C:
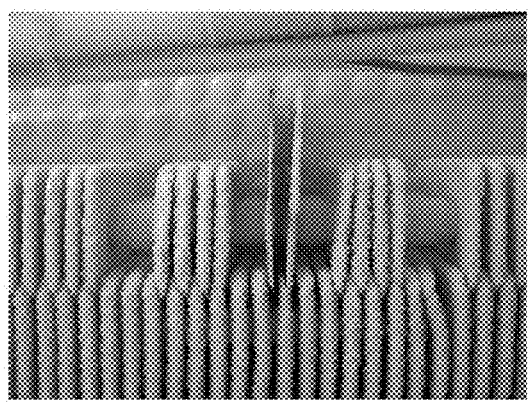

FIGS. 11A, 11B, and 11C are pictures showing frosting delay effects of a part of a heat exchanger including a super-hydrorepellent coating layer and another part that does not include the super-hydrorepellent coating layer.

First, two cooling fins located at the center of the heat exchanger were selected, and the super-hydrorepellent coating layer formed according to Example 2-1 (see E of FIG. 11A) was formed on only the left cooling fin, and any super-hydrorepellent coating layer was not formed on the right cooling fin (see F of FIG. 11A). Then, in order to frost the right and left cooling fins, the refrigerator was driven and a door of a freezer of the refrigerator was open slightly to cause natural frosting by water contained in external air.

FIGS. 11B and 11C are pictures of frosted cooling fins 40 minutes and 80 minutes after the natural frosting, respectively.

Figure 11D:
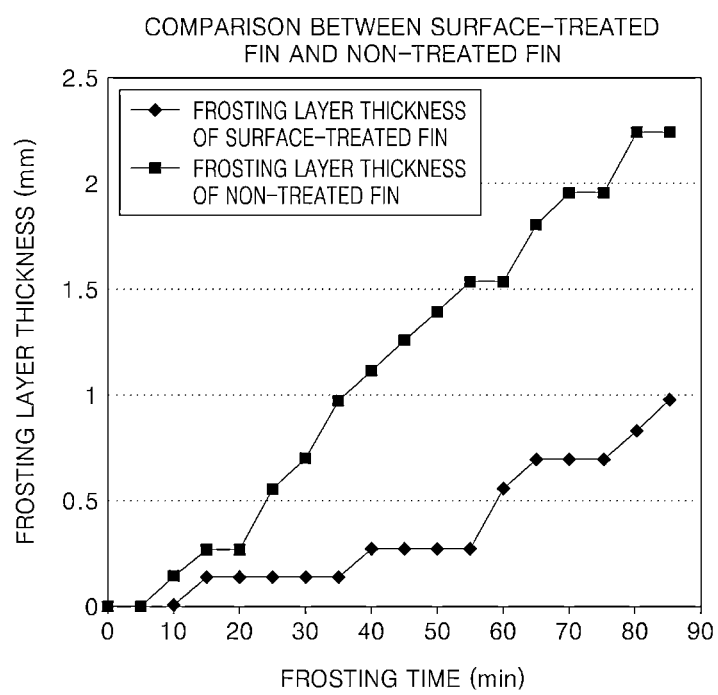
FIG. 11D is a graph of a thickness of the formed frost in connection with FIGS. 11A, 11B, and 11C.

FIG. 11D is a graph showing a difference in frosting of the cooling fin covered by the hydrorepellent coating layer and the cooling fin that is not covered by the super-hydrorepellent coating layer, and in this regard, the thickness of the formed frost layer was evaluated based on the number of pixels of a camera.

Referring to FIGS. 11B to 11D, it can be identified that frosting of the cooling fin covered by the super-hydrorepellent coating layer formed according to Example 2-1 is substantially more delayed than that of the cooling fin that is not covered by the super-hydrorepellent coating layer.

Accordingly, from the evaluation results, the following effects are identified.

First, since frosting of a cooling fin leads to a decrease in a heat exchange rate of the cooling fin and air and a freezing effect by the heat exchanger, delay of frosting of the cooling fin by formation of a super-hydrorepellent coating layer according to an embodiment of the present invention prevents the decrease in decrease in a heat exchange rate of the cooling fin and air and thus, increases the freezing effect by the heat exchanger. Thus, the driving time of a compressor during a freezing cycle may be reduced and thereby, the total power consumption of a refrigerator may be decreased.

Second, when the cooling fin is frosted, a defrosting heater located below the heat exchanger is driven to remove the formed frosts. However, if a super-hydrorepellent coating layer according to an embodiment of the present invention is used and thus the defrosting time is reduced, the defrosting heater may be driven with as low power as about 200 W. If the driving time of the defrosting heater is reduced, the power consumption is also decreased.

Third, when many waterdrops remain on a cooling fin after defrosting, the residual waterdrops are frozen into ice during a freezing cycle and intercepts air flow between cooling pins of the heat exchanger, thereby decreasing the efficiency of the heat exchanger and increasing the driving time of the compressor during a freezing cycle. Accordingly, power consumption may be reduced by decreasing residual waterdrops.

The super-hydrorepellent coating compositions and the super-hydrorepellent coating layer formed using the same, according to above embodiments of the present invention, have been described with reference to Examples and drawings to help understanding. However, the embodiments are just examples and it will be understood by those of ordinary skill in the art that various changes in form and details may be made therein without departing from the spirit and scope of the present invention as defined by the following claims.

What is claimed is:

1. A hydrorepellent coating composition comprising:
   a nano structure,
   polyorganosiloxane,
   a cross-linker, and
   a catalyst;
   wherein:
       the nano structure has at least one of a wire shape, a tube shape, or a fiber shape, or a combination thereof;
       the nano structure has a nano diameter;
       the nano structure comprises at least one kind of substance selected from the group consisting of a carbon nanotube, carbon nanofiber, a Si nanowire, a ZnO nanowire, a Cu nanowire, and a GaN nanowire;
       the diameter of the nano structure is about 1 nm to about 1,000 nm and a length of the nano structure is about 10μm to about 1,000μm; and
       the hydrorepellent coating composition comprises about 8 to about 500 parts by weight of the nano structure, about 1 to about 200 parts by weight of the cross-linker, and about 0.001 to about 10 parts by weight of the catalyst, based on about 100 parts by weight of the polyorganosiloxane.

2. The hydrorepellent coating composition of claim 1, wherein the polyorganosiloxane contains a siloxane repeating unit represented by Formula 1, and a weight average molecular weight of about 200 to about 300,000:

$$—SiR^1R^2O— \qquad \text{<Formula 1>}$$

wherein $R^1$ and $R^2$ are, respectively, a substituted or unsubstituted C1 to C10 alkyl group, a substituted or unsubstituted C1 to C10 alkoxy group, a substituted or unsubstituted C2 to C10 alkenyl group, or a substituted or unsubstituted C6 to C20 aryl group.

3. The hydrorepellent coating composition of claim 1, wherein the polyorganosiloxane comprises at least one kind of material selected from the group consisting of polydimethylsiloxane, polymethylphenylsiloxane, polydiphenylsiloxane, polyfluorinesiloxane, and polyvinylsiloxane, and a copolymer or combination thereof.

4. The hydrorepellent coating composition of claim 1, wherein the cross-linker comprises at least one kind of material selected from the group consisting of a silane-based compound and an organohydrogensiloxane-based compound having a Si-H bond.

5. The hydrorepellent coating composition of claim 1, wherein the catalyst comprises a tin compound, a titanium compound, a zirconium compound, a lead compound, an iron compound, a cobalt compound, an antimony compound, a manganese compound, a bismuth compound, a zinc compound, a platinum compound, a palladium compound, or a rhodium compound.

6. The hydrorepellent coating composition of claim 1, further comprising a filler, wherein the filler comprises any one or more of silica, quartz, titanium dioxide, magnesium oxide, zinc oxide, iron oxide, zirconium oxide, aluminum oxide, magnesium carbonate, calcium carbonate, zinc carbonate, layered mica, carbon black, and diatomaceous earth.

7. The hydrorepellent coating composition of claim 6, wherein the filler comprises any one or more of a filler having a micro diameter and a filler having a nano diameter.

8. The hydrorepellent coating composition of claim 6, wherein the amount of the filler is in a range of about 1 to about 100 parts by weight based on about 100 parts by weight of polyorganosiloxane.

9. A method of forming a hydrorepellent coating layer, comprising;
   forming a coating layer of the nano structure-containing hydrorepellent coating composition of any one of claims 1, 2-7 and 8 on a substance, and
   curing the formed coating layer.

10. The method of claim 9, wherein forming the coating layer is by any one of spin-coating, spray-coating, laminating, or a dip-coating.

11. The method of claim 9, further comprising, following the curing, surface-treating the cured coating layer so as to allow an end of the nano structure to protrude to outside of the coating layer.

12. The method of claim 11, wherein the surface-treating is by any one of a plasma etching or a wet etching.

13. A hydrorepellent coating layer comprising a cured product of a hydrorepellent coating composition comprising:
   a nano structure,
   polyorganosiloxane,
   a cross-linker, and
   a catalyst,
   wherein:
       an end of the nano structure protrudes to outside of the cured product;
       the nano structure has at least one of a wire shape, a tube shape, or a fiber shape, or a combination thereof; and
       the nano structure has a nano diameter
       the nano structure comprises at least one kind of substance selected from the group consisting of a carbon nanotube, carbon nanofiber, a Si nanowire, a ZnO nanowire, a Cu nanowire, and a GaN nanowire;

the diameter of the nano structure is about 1 nm to about 1,000 nm and a length of the nano structure is about 10μm to about 1,000μm; and the hydrorepellent coating composition comprises about 8 to about 500 parts by weight of the nano structure, about 1 to about 200 parts by weight of the cross-linker, and about 0.001 to about 10 parts by weight of the catalyst, based on about 100 parts by weight of the polyorganosiloxane.

14. The hydrorepellent coating layer of claim 13, wherein the cured product further comprises a filler, wherein the filler is located inside the cured product or protrudes to the outside of the cured product.

15. A heat exchanger comprising the hydrorepellent coating layer of claim 13 or claim 14 on a surface of the heat exchanger.

* * * * *